(12) United States Patent
Daehler et al.

(10) Patent No.: US 7,830,112 B2
(45) Date of Patent: Nov. 9, 2010

(54) METHOD FOR OPERATING A TRACTION CONVERTER CIRCUIT FOR COUPLING TO AN ELECTRIC DC VOLTAGE NETWORK

(75) Inventors: Peter Daehler, Remigen (CH); Beat Guggisberg, Untersiggenthal (CH)

(73) Assignee: ABB Schweiz AG, Baden (CH)

( * ) Notice: Subject to any disclaimer, the term of this patent is extended or adjusted under 35 U.S.C. 154(b) by 651 days.

(21) Appl. No.: 11/783,203

(22) Filed: Apr. 6, 2007

(65) Prior Publication Data
US 2007/0236964 A1    Oct. 11, 2007

(30) Foreign Application Priority Data
Apr. 6, 2006    (EP)    ............................ 06405150

(51) Int. Cl.
*H02J 7/00*    (2006.01)
*H02J 7/14*    (2006.01)

(52) U.S. Cl. .................... 320/104; 238/191; 363/34

(58) Field of Classification Search ............. 363/34; 238/191; 320/103, 104
See application file for complete search history.

(56) References Cited

U.S. PATENT DOCUMENTS

| 5,313,381 | A | * | 5/1994 | Balakrishnan | ............... | 363/147 |
| 5,420,777 | A | * | 5/1995 | Muto | .................... | 363/21.17 |
| 5,790,391 | A | * | 8/1998 | Stich et al. | .................... | 363/24 |
| 6,310,787 | B2 | * | 10/2001 | Ito et al. | .................... | 363/34 |
| 2001/0026460 | A1 | * | 10/2001 | Ito et al. | .................... | 363/34 |

FOREIGN PATENT DOCUMENTS

| DE | 32 27 569 A1 | 1/1984 |
| EP | 1 263 125 A2 | 12/2002 |
| EP | 1 479 558 A | 11/2004 |

OTHER PUBLICATIONS

PTO 10-3739, English translation of DE Search Report, May 2010.*
European Search Report, Sep. 14, 2006.

\* cited by examiner

*Primary Examiner*—Edward Tso
*Assistant Examiner*—Samuel Berhanu
(74) *Attorney, Agent, or Firm*—Buchanan Ingersoll & Rooney PC

(57) ABSTRACT

A method for operating a traction converter circuit for coupling to an electric DC voltage network is stated, where the traction converter circuit comprises a network converter, which network converter on the DC voltage side is connected with a DC voltage circuit, wherein the DC voltage circuit can be switched to the electric DC voltage network, a transformer with a primary winding and a secondary winding, wherein the network converter on the alternating voltage side is connected with the primary winding of the transformer, a converter unit, which converter unit on the alternating voltage side is connected with the secondary winding of the transformer and where the network converter is controlled by means of a predeterminable network converter control signal ($S_N$) for the setting of the network converter alternating voltage ($U_G$). To simplify the traction converter circuit the network converter control signal ($S_N$) according to the method is a rectangular signal which follows a reference rectangular signal ($S_{Clk}$).

15 Claims, 4 Drawing Sheets

METHOD FOR OPERATING A TRACTION CONVERTER CIRCUIT FOR COUPLING TO AN ELECTRIC DC VOLTAGE NETWORK

RELATED APPLICATIONS

This application claims priority under 35 U.S.C. §119 to EP Application 06405150.1 filed in Europe on Apr. 6, 2006, the entire contents of which are hereby incorporated by reference in their entireties.

TECHNICAL FIELD

The disclosure relates to the area of power electronics. It is based on a method for operating a traction converter circuit for coupling to an electric DC voltage network.

BACKGROUND INFORMATION

Today, traction converter circuits are employed in a multitude of power electronic applications, more preferably for rail-bound vehicles such as electric railways. Especially during country-overlapping use of rail-bound vehicles it must be possible for the drive energy to be drawn or fed from different electric supply networks, i.e. from different electric DC voltage networks and AC voltage networks of different network voltage. This requires traction converter circuits which can be coupled to an electric supply network based on a DC voltage and also to an electric supply network based on an AC voltage. Popular electric supply networks, more preferably for rail networks with an alternating voltage source are based on an alternating voltage of 15 kV with a frequency of 16⅔ Hz or of 25 kV and 50 Hz. Popular electric supply networks, more preferably for rail networks, with a DC voltage source are based on a DC voltage of 1.5 kV or 3 kV. A suitable traction converter circuit for coupling to an electric DC voltage network is stated for example in DE 1 479 558 A1. Therein, the traction converter circuit comprises a network converter, which network converter on the DC voltage side is connected with a DC voltage circuit, wherein the DC voltage circuit can be switched to the electric DC voltage network. In addition, the traction converter circuit has a transformer with a primary winding and a secondary winding, wherein the network converter on the alternating voltage side is connected with the primary winding of the transformer. Furthermore, a converter unit is provided, which converter unit on the alternating voltage side is connected with the secondary winding of the transformer. According to the method the network converter is controlled by means of a predeterminable network converter control signal for the setting of the network converter alternating voltage, wherein the network converter control signal is typically generated through pulse width modulation of a sinusoidal signal, popularly a sinusoidal voltage signal with a triangular signal, as a result of which a switching frequency in the kilohertz range is popularly obtained.

At its alternating voltage side the network converter generates a voltage with a basic frequency for example of 100 Hz. As a consequence, a double frequency power oscillation of then 200 Hz is obtained which must not be passed on to the DC voltage side in the DC voltage circuit and consequently into the electric DC voltage network. To this end a filter circuit (acceptor circuit) in form of an LC filter must be provided on the DC voltage circuit which is mainly tuned to double the basic frequency of the voltage on the alternating voltage side of the network converter so that this double frequency voltage component can be filtered out on the DC voltage side of the network converter. However, such a filter circuit on the DC voltage side is very heavy, requires a lot of space, is lossy, reduces the reliability of the traction converter circuit and significantly increases the hardware costs.

SUMMARY

A method is disclosed for the operation of a traction converter circuit for coupling to an electric DC voltage network through which the traction converter circuit can be simplified. An exemplary method for the operation of a traction converter circuit for coupling to an electric DC voltage network the traction converter circuit comprises a network converter, which network converter on the DC voltage side is connected with a DC voltage circuit, wherein the DC voltage circuit can be switched to the electric DC voltage network. Furthermore, the traction converter circuit comprises a transformer with a primary winding and a secondary winding, wherein the network converter on the alternating voltage side is connected with the primary winding of the transformer, and a converter unit, which converter unit on the alternating voltage side is connected with the secondary winding of the transformer. According to the method, the network converter is controlled by means of a predeterminable network converter control signal for setting the network converter alternating voltage. An exemplary network converter control signal is a rectangular signal which follows a reference rectangular signal. As a result, merely a very low frequency power oscillation with low amplitude is obtained on the DC voltage side of the network converter so that with advantage a filter circuit on the DC voltage circuit known from the prior art can be omitted and the traction converter circuit is thus greatly simplified. By saving the filter circuit it is additionally possible with regard to the traction converter circuit to significantly save weight, space and hardware costs, reduce losses and increase the reliability and availability of the traction converter circuit. The utilisation of the power semiconductor switches of the network static converter is also increased through the rectangular network converter control signal while the thermal load is reduced.

BRIEF DESCRIPTION OF THE DRAWINGS

This and additional objects, advantages and features of the present invention become apparent from the following detailed description of exemplary embodiments of the invention in connection with the drawing. It shows.

The reference numbers and their meaning used in the drawing are listed in summary in the list of reference numbers. Generally, identical parts are provided with identical reference numbers in the Figure. The embodiments described serve as exemplary disclosures and are not meant to be restrictive.

DETAILED DESCRIPTION

Figure 1:
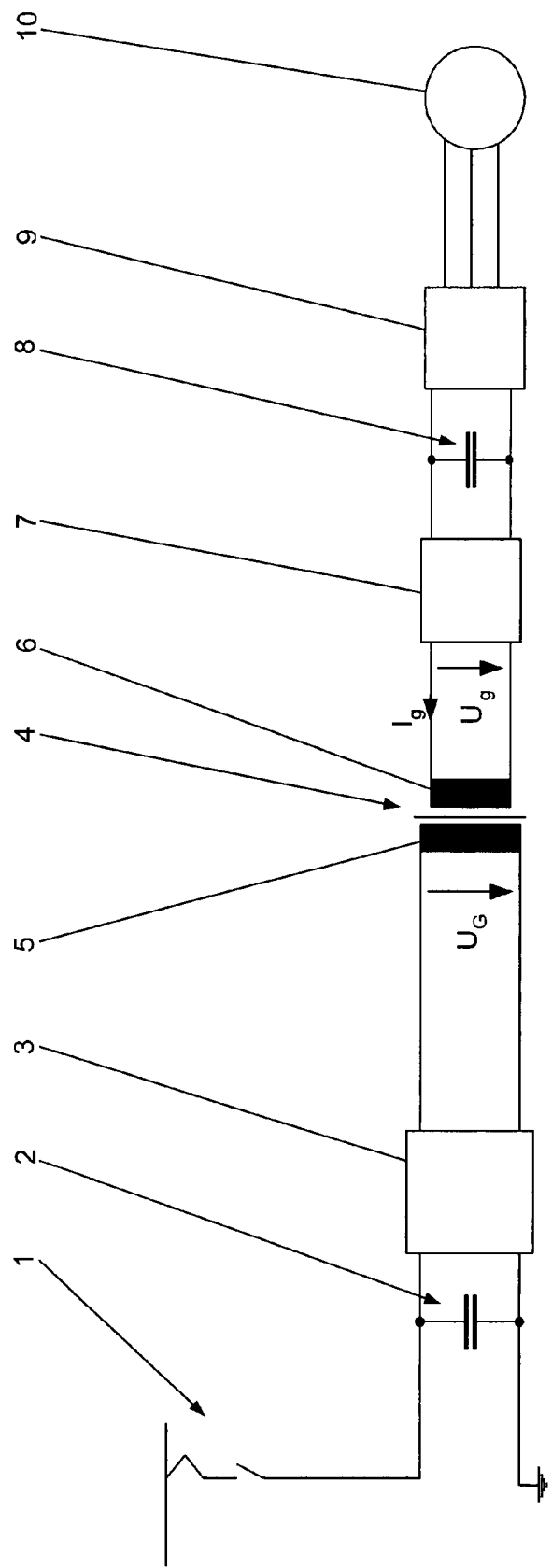
FIG. 1 an exemplary embodiment of a traction converter circuit for coupling to an electric DC voltage network, FIG. 2 time curve of physical variables of the traction converter circuit with an electric energy flow from the network converter of the traction converter circuit to the converter unit of the traction converter circuit according to an exemplary method, FIG. 3 time curve of the reference rectangular signal and the network converter control signal of the traction converter circuit according to an exemplary method and FIG. 4 time curve of physical variables of the traction converter circuit with an electric energy flow from the network converter of the traction converter circuit to the converter unit of the traction converter circuit according to an exemplary method.
Figure 2:
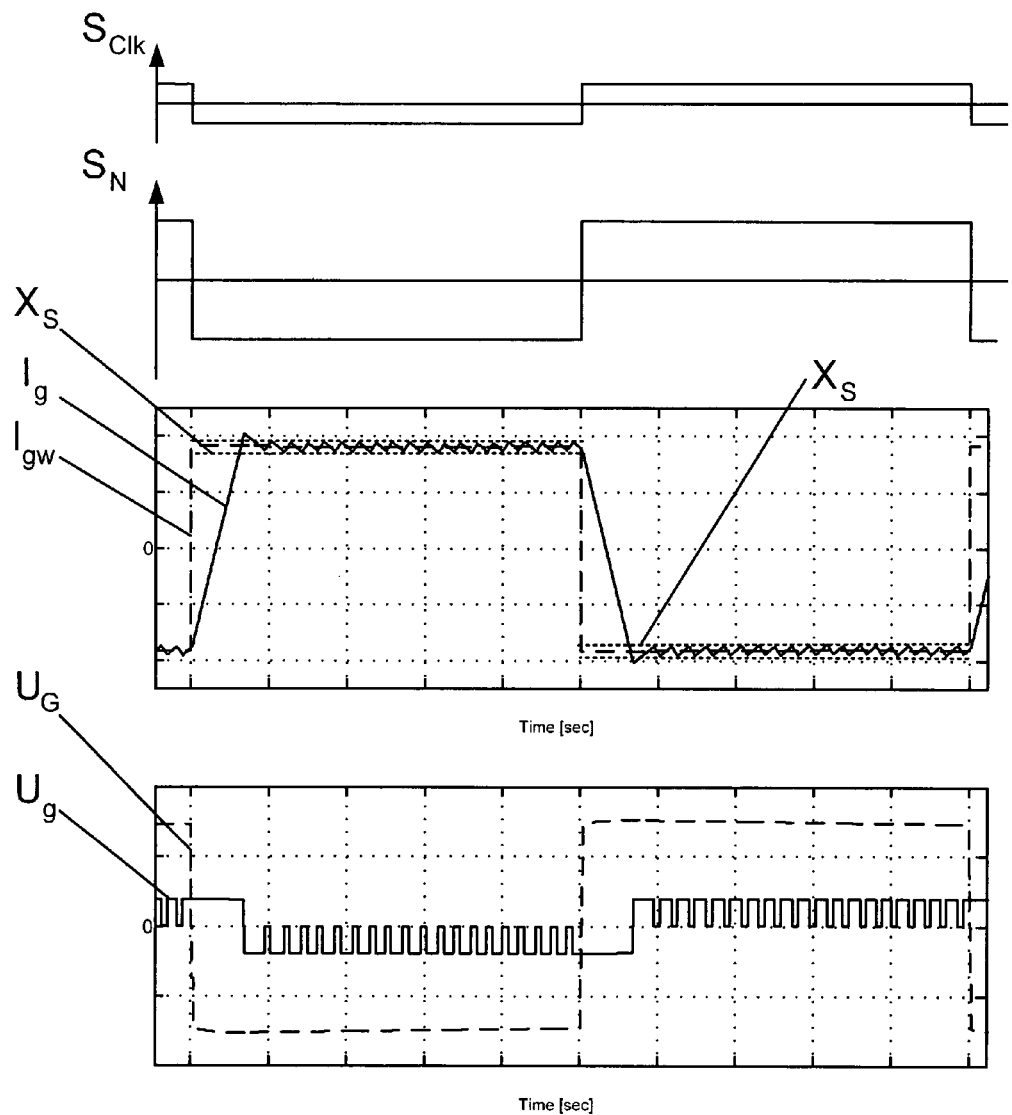

An exemplary embodiment of a traction converter circuit for coupling to an electric DC voltage network 1 is shown in FIG. 1. The electric DC voltage network typically has a DC voltage of 1.5 kV or 3 kV. The traction converter circuit for coupling to the electric DC voltage network 1 shown in FIG. 1 comprises a network converter 2, which network converter 2 on the DC voltage side is connected with a DC voltage circuit 3, wherein the DC voltage circuit 3 can be switched to the electric DC voltage network 1. The DC voltage circuit 3 has a capacitive energy store, but can also have several, series-connected capacitive energy stores, for example. Furthermore, the traction converter circuit comprises a transformer 4 with a primary winding 5 and a secondary winding 6, wherein the network converter 2 on the alternating voltage side is connected with the primary winding 5 of the transformer 4. In addition to this, the traction converter circuit has a converter unit 7, which converter unit 7 on the alternating voltage side is connected with the secondary winding 6 of the transformer 4. As is exemplarily shown in FIG. 1, a DC voltage circuit 8 can be connected to the DC voltage side of the converter unit 7, with which for example a drive converter 9 is connected which for example feeds a drive motor 10. According to the method, the network converter 2 is controlled by means of a predeterminable network converter control signal $S_N$ for setting the network converter alternating voltage $U_G$. An exemplary network converter control signal $S_N$ is a rectangular signal which follows a reference rectangular signal $S_{Clk}$. For example, the reference rectangular signal $S_{Clk}$ and the network converter control signal $S_N$ each have a periodic course, wherein it has proved to be particularly advantageous that the period duration of the network converter control signal $S_N$ is selected between 5 ms and 25 ms. With an electric energy flow from the network converter 2 to the converter unit 7. FIG. 2 shows the time curve of the reference rectangular signal $S_{Clk}$ and the network converter control signal $S_N$ according to an exemplary method as well as additional physical variables of the traction converter circuit, which will still be described in detail.

Because the network converter control signal SN is a rectangular signal which follows a reference rectangular signal $S_{Clk}$, only a very low frequency power oscillation with small amplitude is obtained on the DC voltage side of the network converter 2 so that with advantage a filter circuit on the DC voltage circuit 3 known from the prior art can be omitted and the traction converter circuit is thus greatly simplified. By saving the filter circuit through the exemplary method it is also possible with regard to the traction converter circuit to significantly save weight, space and hardware costs as well as reduce losses and increase the reliability and availability of the traction converter circuit. In addition, the power semiconductor switches of the network static converter are better utilised to advantage through the rectangular network converter control signal SN while the thermal load is reduced.

Figure 3:
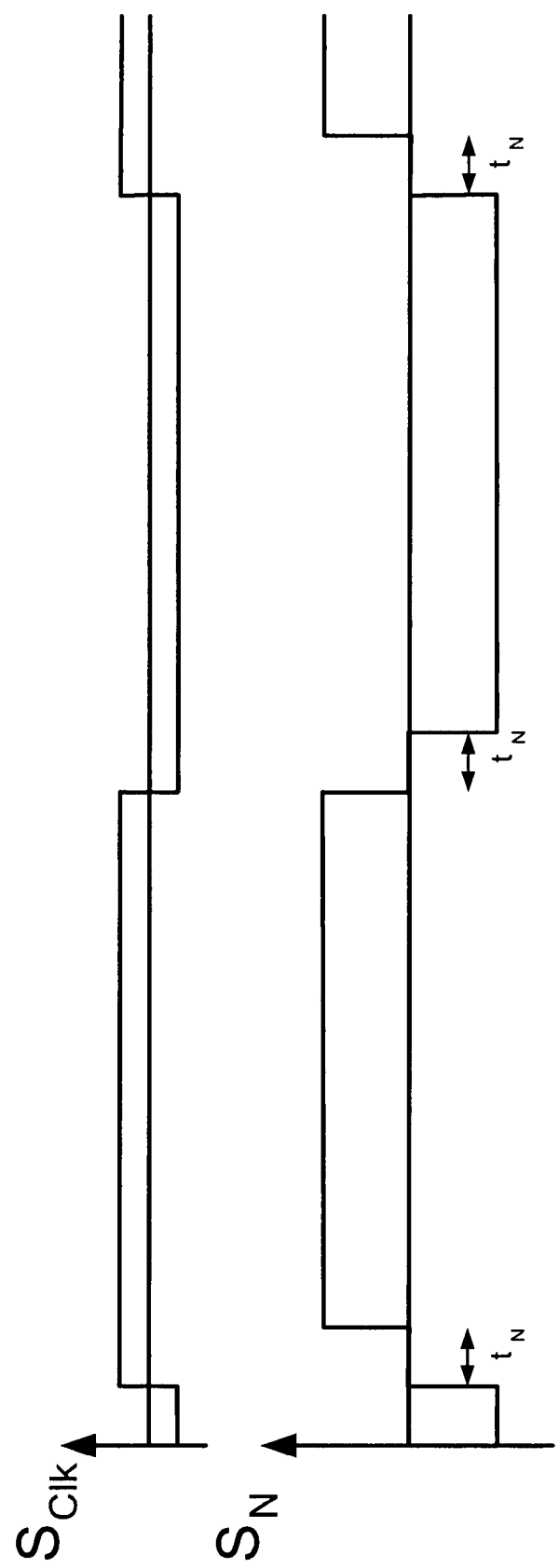

A time curve of the reference rectangular signal $S_{Clk}$ and the network converter control signal $S_N$ of the traction converter circuit according to an exemplary method is shown in FIG. 3, for example, with an electric energy flow from the network converter 2 to the converter unit 7. Here, the rectangular signal of the network converter control signal $S_N$ at every polarity changing time of the network converter control signal $S_N$ initially has a zero value for an adjustable period of time $t_N$, wherein, then, after expiry of the adjustable period of time $t_N$, the polarity change is effected. With advantage it is possible through this measure to avoid undesirable overvoltages on open transformer windings which traction converter circuits can typically have, but which are not shown in FIG. 1 for the sake of clarity, since with advantage damping attenuation of the voltage at the respective open transformer winding takes place. A maximum of 10% of half of the period of the reference rectangular signal $S_{Clk}$ can be set as period of time $t_N$. Such a period of time $t_N$ selected in this way corresponds with advantage to half the resonant cycle time of an equivalent attenuated RLC resonant circuit.

As already mentioned, FIG. 2 shows the time curve of the reference rectangular signal $S_{Clk}$ and the network converter control signal $S_N$ as well as additional physical variables of the traction converter circuit with an electric energy flow from the network converter 2 to the converter unit 7. The electric energy flow from the network converter 2 to the converter unit 7, with a traction converter circuit which for example is used in a vehicle, e.g., in a rail-bound vehicle, corresponds to the operating state "driving", since the converter unit 7 in this operating state feeds the DC voltage circuit 8 from which the drive motor 10 is then fed by the drive converter 9. According to the method the network converter 2, as already described, is controlled by means of the network converter control signal $S_N$ for setting the network converter alternating voltage $U_G$ so that the network converter alternating voltage $U_G$, as shown in FIG. 2, has a rectangular in-phase curve corresponding to the network converter control signal SN. According to FIG. 2, the converter unit 7 is controlled in accordance with a converter unit current reference signal $I_{gw}$. The converter unit current reference signal $I_{gw}$ can also be a rectangular signal. During the electric energy flow from the network converter 2 to the converter unit 7 according to FIG. 2 the network converter control signal $S_N$ follows the reference rectangular signal $S_{Clk}$ in-phase, i.e., the network converter control signal SN is in-phase with the reference rectangular signal $S_{Clk}$ with regard to the course of time. Moreover, the converter unit current reference signal $I_{gw}$, according to FIG. 2, is then selected in-phase opposition to the reference rectangular signal $S_{Clk}$, wherein the time of polarity change of the converter unit current reference signal $I_{gw}$, corresponds to the time of the polarity change of the reference rectangular signal $S_{Clk}$. Further, the converter unit current $I_g$ on the secondary winding 6 of the transformer 4 according to FIG. 2, follows the converter unit current reference signal $I_g$, i.e. the converter unit current $I_g$ is, for example, regulated to the converter unit current reference signal $I_{gw}$, wherein the converter unit current $I_g$ largely has a trapezoidal curve because of the stray inductance of the transformer. For the regulation mentioned above a current regulator can be provided. In addition, the converter unit current $I_g$ according to an exemplary method is monitored for a threshold value $X_S$ of a tolerance range around the constant value of the converter unit current reference signal $I_{gw}$. The tolerance band around the constant value of the converter unit current reference signal $I_{gw}$ is hinted in FIG. 2 as two dotted lines, wherein the time curve of the converter unit current reference signal $I_{gw}$ is hinted as a dashed line. On reaching the threshold value XS for the first time within half a period of the reference rectangular signal $S_{Clk}$ the converter unit voltage $U_g$ is then switched on the secondary winding 6 of the transformer 4 to the polarity of the reference rectangular signal $S_{Clk}$ through appropriate control of the converter unit 7 as shown in FIG. 2. On reaching the threshold value $X_S$ for the first time within half a period of the reference rectangular signal $S_{Clk}$ the converter unit current $I_g$ can be maintained within the tolerance range through appropriate control of the converter unit 7 and thus retains its polarity with advantage, as shown in FIG. 2, to the next time of polarity change. The curve of the converter unit voltage $U_g$ according to FIG. 2 is obtained from the said control of the converter unit 7 on reaching the threshold value $X_S$ for the first time and through appropriate control of the converter unit 7 so that the converter unit current $I_g$ is maintained within the tolerance range. On the whole, the power semiconductor switches of the converter unit 7 can be utilised highly efficiently through the rectangular predetermination of the converter unit current reference signal $I_{gw}$ and the following of the converter unit current $I_g$ as well as through the additional measures described above. As a result, the losses of the power semiconductor switches of the converter unit 7 are reduced and the reliability of the converter unit 7 and thus the entire traction converter circuit increased.

Figure 4:
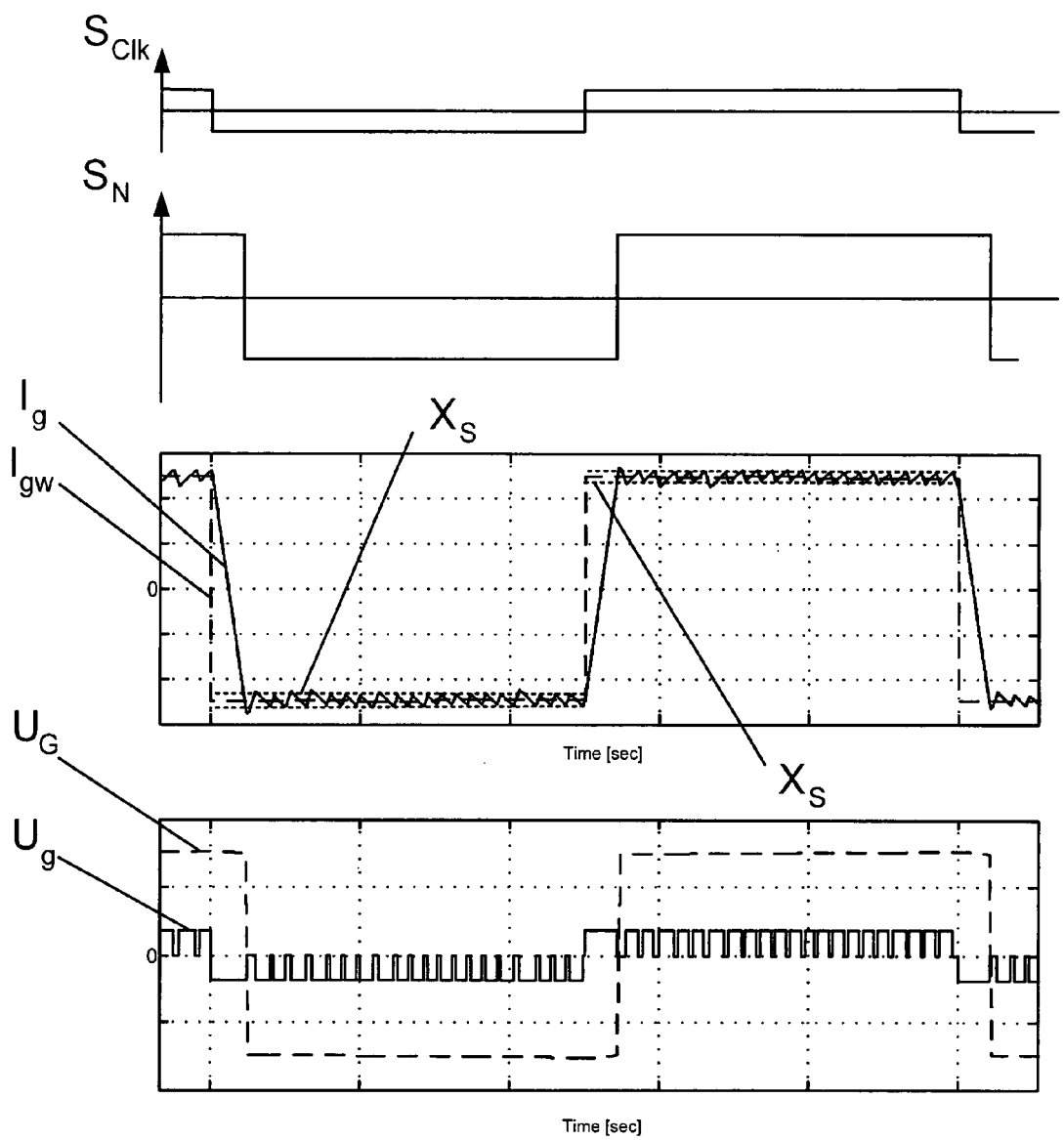

FIG. 4 shows the time curve of the reference rectangular signal $S_{Clk}$, the network converter control signal $S_N$, the converter unit current reference signal $I_{gw}$, the converter unit current $I_g$, the network converter alternating voltage $U_G$ and the converter unit voltage $U_g$ with an electric energy flow from the converter unit 7 to the network converter 2. The electric energy flow from the converter unit 7 to the network converter 2, in a traction converter circuit as used for example in a vehicle, e.g., in a rail-bound vehicle, corresponds to the operating state "braking", since the drive motor 10 in this operating state feeds the DC voltage circuit 8 by way of the drive converter 9, from which electric energy is then fed into the electric DC voltage network 1 by way of the converter unit 7, the transformer 4 and the network converter 2. According to the method, the network converter 2, as already described, is controlled by means of the network converter control signal $S_N$ for setting the network converter alternating voltage $U_G$ so that the network converter alternating voltage $U_G$, as shown in FIG. 4, has a rectangular in-phase curve corresponding to the network converter control signal $S_N$. According to FIG. 4 the converter unit 7 is also controlled in accordance with the converter unit current reference signal $I_{gw}$, wherein the converter unit current reference signal $I_{gw}$ can also be a rectangular signal. With an electric energy flow from the converter unit 7 to the network converter 2 according to FIG. 4 the converter unit current reference signal $I_{gw}$ is now selected in-phase with the reference rectangular signal $S_{Clk}$, while the time of the polarity change of the converter unit current reference signal $I_{gw}$ corresponds to the time of the polarity change of the reference rectangular signal $S_{Clk}$. In addition, the converter unit current $I_g$ on the secondary winding 6 of the transformer 4 follows the converter unit current reference signal $I_{gw}$, i.e. the converter unit current $I_g$ can be regulated to the converter unit current reference signal $I_{gw}$, while the converter unit current $I_g$ largely has a trapezoidal curve because of the stray inductance of the transformer. For the aforementioned control said current regulator can be provided. In addition, the converter unit current $I_g$ is monitored for a threshold value $X_S$ of a tolerance range around the constant value of the converter unit current reference signal $I_{gw}$. The tolerance band around the constant value of the converter unit current reference signal $I_{gw}$ is hinted in FIG. 4 as two dotted lines while the time curve of the converter unit current reference signal $I_{gw}$ is hinted as a dashed line. Upon reaching of the threshold value $X_S$ for the first time within half a period of the reference rectangular signal $S_{Clk}$ the converter unit voltage $U_g$ at the secondary winding 6 of the transformer 4 is then switched to the polarity of the reference rectangular $S_{Clk}$ through appropriate control of the converter unit 7 and the network converter control signal $S_N$ switched to the polarity of the reference rectangular signal $S_{Clk}$, as shown in FIG. 4. On reaching the threshold value $X_S$ for the first time within half a period of the reference rectangular signal $S_{Clk}$ the converter unit current $I_g$ can be maintained within the tolerance range through appropriate control of the converter unit 7 and thus advantageously maintains its polarity as shown in FIG. 4 to the next time of polarity change. The curve of the converter unit voltage $U_g$ according to FIG. 4 is obtained from the set control of the converter unit 7 on reaching the threshold value $X_S$ for the first time and through the appropriate control of the converter unit 7 so that the converter unit current $I_g$ is maintained within the tolerance range. On the whole, the power semiconductor switches of the converter unit 7 can be utilised very efficiently through the rectangular predetermination of the converter unit current reference signal $I_{gw}$ and the following of the converter unit current $I_g$ as well as through the further measures described above even with an electric energy flow from the converter unit 7 to the network converter 2. As a result, the losses of the power semiconductor switches of the converter unit 7 are also reduced in this operating state of the traction converter circuit and the reliability of the converter unit 7 and thus of the entire traction converter circuit is increased.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE NUMBERS

1 Electric DC voltage network
2 Network converter
3 DC voltage circuit
4 Transformer
5 Primary winding of the transformer
6 Secondary winding of the transformer
7 Converter unit
8 DC voltage circuit
9 Driver converter
10 Drive motor

What is claimed is:

1. A method for operating a traction converter circuit for coupling to an electric DC voltage network where the traction converter circuit comprises a network converter, which network converter on the DC voltage side is connected with a DC voltage circuit, wherein
   the DC voltage circuit can be switched to the electric DC voltage network,
   a transformer with a primary winding and a secondary winding, wherein the network converter on the alternating voltage side is connected with the primary winding of the transformer,
   a converter unit, which converter unit on the alternating voltage side is connected with the secondary winding of the transformer, and where the network converter is controlled by means of a predefinable network converter control signal ($S_N$) for setting the network converter alternating voltage ($U_G$),
   wherein
   the network converter control signal ($S_N$) is a rectangular signal which follows a reference rectangular signal ($S_{Clk}$).

2. The method according to claim 1, wherein the period of the network converter control signal ($S_N$) is selected between 5 ms and 25 ms.

3. The method according to claim 1, wherein the rectangular signal of the network converter control signal ($S_N$) at every time of polarity change of the network converter control signal ($S_N$) initially has a zero value for an adjustable period of time ($t_N$) and wherein after expiry of the adjustable period of time ($t_N$) the change in polarity is completed.

4. The method according to claim 3, wherein as period ($t_N$) a maximum of 10% of half the period of the reference rectangular signal ($S_{Clk}$) is set.

5. The method according to claim 1, wherein the converter unit is controlled in accordance with a converter unit current reference signal ($I_{gw}$).

6. The method according to claim 5, wherein the converter unit current reference signal ($I_{gw}$) is a rectangular signal.

7. The method according to claim 6, wherein with an electric energy flow from the network converter to the converter unit the network converter control signal ($S_N$) follows the reference rectangular signal ($S_{Clk}$) in-phase, wherein the converter unit current reference signal ($I_{gw}$) is selected in-phase opposition to the reference rectangular signal ($S_{Clk}$), wherein the time of the polarity change of the converter unit current reference signal ($I_{gw}$) corresponds to the time of the polarity change of the reference rectangular signal ($S_{Clk}$), and wherein the converter unit current ($I_g$) at the secondary winding of the transformer follows the converter unit current reference signal ($I_{gw}$).

8. The method according to claim 7, wherein the converter unit current ($I_g$) is monitored for a threshold value ($X_S$) of a tolerance range around the constant value of the converter unit current reference signal ($I_{gw}$), and wherein on reaching the threshold value ($X_S$) for the first time within half a period of the reference rectangular signal ($S_{Clk}$) the converter unit voltage ($U_g$) on the secondary winding of the transformer is switched to the polarity of the reference rectangular signal ($S_{Clk}$) through appropriate control of the converter unit.

9. The method according to claim 6, wherein with an electric energy flow from the converter unit to the network converter the converter unit current reference signal ($I_{gw}$) is selected in-phase with the reference rectangular signal ($S_{Clk}$), wherein the time of the polarity change of the converter unit current reference signal ($I_{gw}$) corresponds to the time of the polarity change of the reference rectangular signal ($S_{Clk}$), and wherein the converter unit current ($I_g$) on the secondary winding of the transformer follows the converter unit current reference signal ($I_{gw}$).

10. The method according to claim 9, wherein the converter unit current ($I_g$) is monitored for a threshold value ($X_S$) of a tolerance range around the constant value of the converter unit current reference signal ($I_{gw}$), and wherein on reaching the threshold value ($X_S$) for the first time within half a period of the reference rectangular signal ($S_{Clk}$) the converter unit voltage ($U_g$) on the secondary winding of the transformer is switched to the polarity of the reference rectangular signal ($S_{Clk}$) through appropriate control of the converter unit and the network converter control signal ($S_N$) is switched to the polarity of the reference rectangular signal ($S_{Clk}$).

11. The method according to claim 8, wherein on reaching the threshold value ($X_S$) for the first time within half a period of the reference rectangular signal ($S_{Clk}$) the converter unit current ($I_g$) is maintained within the tolerance range through suitable control of the converter unit.

12. The method according to claim 2, wherein the rectangular signal of the network converter control signal ($S_N$) at every time of polarity change of the network converter control signal ($S_N$) initially has a zero value for an adjustable period of time ($t_N$) and wherein after expiry of the adjustable period of time ($t_N$) the change in polarity is completed.

13. The method according to claim 4, wherein the converter unit is controlled in accordance with a converter unit current reference signal ($I_{gw}$).

14. The method according to claim 10, wherein on reaching the threshold value ($X_S$) for the first time within half a period of the reference rectangular signal ($S_{Clk}$) the converter unit current ($I_g$) is maintained within the tolerance range through suitable control of the converter unit.

15. A method for operating a traction converter circuit for coupling to an electric DC voltage network where the traction converter circuit comprises a network converter, which network converter on the DC voltage side is connected with a DC voltage circuit, wherein the DC voltage circuit can be switched to the electric DC voltage network, a transformer with a primary winding and a secondary winding, the method comprising:

connecting the network converter on the alternating voltage side with the primary winding of the transformer;

connecting a converter unit on the alternating voltage side with the secondary winding of the transformer; and controlling the network converter based on a control signal ($S_N$) for setting a network converter alternating voltage ($U_G$), wherein the control signal ($S_N$) is a rectangular signal which follows a reference rectangular signal ($S_{Clk}$).

\* \* \* \* \*